US008244771B2

(12) United States Patent
Watanabe et al.

(10) Patent No.: US 8,244,771 B2
(45) Date of Patent: Aug. 14, 2012

(54) INFORMATION PROCESSING DEVICE FOR ACCEPTING DESCRIPTION INFORMATION OF MULTI-MEDIA CONTENT INCLUDING KEYWORDS AND REFERENCE INFORMATION INDICATIVE OF DUPLICATIVE OCCURRENCE OF EACH KEYWORD AND RETRIEVING LOCATION INFORMATION IN THE CONTENT USING THE RESPECTIVE KEYWORDS AND ASSOCIATED REFERENCE INFORMATION

(75) Inventors: Shuichi Watanabe, Chiba (JP); Jiro Kiyama, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/798,279

(22) Filed: Mar. 31, 2010

(65) Prior Publication Data

US 2010/0198801 A1    Aug. 5, 2010

Related U.S. Application Data

(62) Division of application No. 11/667,815, filed as application No. PCT/JP2005/020289 on Nov. 4, 2005, now Pat. No. 8,166,073.

(30) Foreign Application Priority Data

Dec. 3, 2004    (JP) ................................. 2004-351558

(51) Int. Cl.
G06F 17/30    (2006.01)
(52) U.S. Cl. ..................................................... 707/796
(58) Field of Classification Search .................. 707/791, 707/796, E17.123
See application file for complete search history.

(56) References Cited

U.S. PATENT DOCUMENTS

| 6,571,239 | B1 | 5/2003 | Cole |
| 6,635,088 | B1* | 10/2003 | Hind et al. ..................... 715/236 |
| 6,771,875 | B1 | 8/2004 | Kunieda et al. |
| 2003/0005001 | A1 | 1/2003 | Kataoka |
| 2003/0074671 | A1 | 4/2003 | Murakami et al. |
| 2005/0021862 | A1 | 1/2005 | Schroeder |
| 2009/0198685 | A1* | 8/2009 | Bartholomew ................... 707/5 |

FOREIGN PATENT DOCUMENTS

EP    1610228 A1    12/2005
(Continued)

OTHER PUBLICATIONS

Hunter, A comparison of schemas for video metadata representation, 2003, Computer Networks 31, 1999, pp. 1431-1451.*

(Continued)

*Primary Examiner* — John E Breene
*Assistant Examiner* — Albert Phillips, III
(74) *Attorney, Agent, or Firm* — Edwards Wildman Palmer LLP; David G. Conlin; David A. Tucker

(57) ABSTRACT

There are provided a storage device and a computer-readable medium capable of efficiently storing keywords contained in description information and efficiently retrieving the keyword. A list producing portion (6) extracts the keywords from the description information and produces a keyword list correlating the keywords with the scene information containing the keywords. A description information converter (8) converts the keywords contained in the keyword list received from the list producing portion (6) among the keywords contained in the externally received description information into reference information for specifying the keywords in the keyword list received from the list producing portion (6). A storage (10) stores the converted description information provided from the description information converter (8) and the keyword list provided from the list producing portion (6).

3 Claims, 15 Drawing Sheets

FOREIGN PATENT DOCUMENTS

| | | |
|---|---|---|
| JP | 05-282379 | 10/1993 |
| JP | 08-110912 | 4/1996 |
| JP | 2000-148796 A | 5/2000 |
| JP | 2002-123523 A | 4/2002 |
| JP | 2002-132834 A | 5/2002 |
| JP | 2002-278950 A | 9/2002 |
| JP | 2002-297568 | 10/2002 |
| JP | 2003-030030 | 1/2003 |
| JP | 2003-099453 | 4/2003 |
| WO | WO-2004/079586 A1 | 9/2004 |

OTHER PUBLICATIONS

Auffret, Hypertext '99, Audiovisual based Hypermedia Authoring: using structured representations for efficient access to AV documents, 1999, pp. 169-178.*

Kazunari Ito et al.; "*Media Data ni Taisuru Annotation Kijutsu Gengo (MAML) no Sakutei to Sono Oyo*"; Information Processing Society of Japan Kenkyu Hokoku; vol. 2003; No. 37; Mar. 28, 2003; pp. 19-26.

Elizabeth Liddy, How a Search Engine Works, Searcher, vol. 9, No. 5, May 2001, pp. 1-8.

Shuichi Watanabe, "2 Standard Technology"; The Journal of the Institute of Image Information and Television Engineers; vol. 56, No. 11; 2002; pp. 1726-1730.

Masayuki Hiyama et al; "Theory and Practice of XML Vocabulary" No. 21, pp. 149-155.

Jane Hunter and Liz Armstrong; "A comparison of schemas for video metadata representation"; pp. 1431-1451, Computer Networks 31 (1999).

Charles Heinemann: "Cross-Reference Your XML Data", Microsoft Corporation, Dec. 7, 1998, pp. 1 through 7.

* cited by examiner

FIG.2

```
<Sequence>
    <Scene num='1'>
        <Time start='00:00:00' duration='3mins' />
        <Title value='Basic Skit' />
        <Actors>
            <Actor value='Akira ABE' />
            <Actor value='Keiko KUBO' />
            <Actor value='Wataru WADA' />
        </Actors>
    </Scene>
    <Scene num='2'>
        <Time start='00:03:00' duration='5mins' />
        <Title value='Challenge Skit' />
        <Actors>
            <Actor value='Wataru WADA' />
        </Actors>
    </Scene>
    <Scene num='3'>
        <Time start='00:08:00' duration='5mins' />
        <Title value='Study Skit' />
        <Actors>
            <Actor value='Akira ABE' />
            <Actor value='Wataru WADA' />
        </Actors>
    </Scene>
    <Scene num='4'>
        <Time start='00:13:00' duration='2mins' />
        <Title value='Advanced Skit' />
        <Actors>
            <Actor value='Akira ABE' />
        </Actors>
    </Scene>
</Sequence>
```

CONVENTIONAL ART

| Actors List | | |
|---|---|---|
| ID | value | scenes |
| 1 | Akira ABE | 1, 3, 4 |
| 2 | Keiko KUBO | 1 |
| 3 | Wataru WADA | 1, 2, 3 |

301  302  303

(b)

```
<ActorsList>
  <Actor value='Akira ABE'>
    <Scenes>1, 3, 4</Scenes>
  </Actor>
  <Actor value=' Keiko KUBO'>
    <Scenes>1</Scenes>
  </Actor>
  <Actor value=' Wataru WADA'>
    <Scenes>1, 2, 3</Scenes>
  </Actor>
</ActorsList>
```

FIG.11

| Credit List | |
|---|---|
| Actors | |
| ID | value |
| 1 | Akira ABE |
| 2 | Keiko KUBO |
| 3 | Wataru WADA |
| Producers | |
| | |
| | .... |
| Writers | |
| | |
| | .... |

....

INFORMATION PROCESSING DEVICE FOR ACCEPTING DESCRIPTION INFORMATION OF MULTI-MEDIA CONTENT INCLUDING KEYWORDS AND REFERENCE INFORMATION INDICATIVE OF DUPLICATIVE OCCURRENCE OF EACH KEYWORD AND RETRIEVING LOCATION INFORMATION IN THE CONTENT USING THE RESPECTIVE KEYWORDS AND ASSOCIATED REFERENCE INFORMATION This application is a divisional application of copending U.S. patent application Ser. No. 11/667,815, entitled STORAGE DEVICE AND RECORDING MEDIUM by Shuichi Watanabe and Jiro Kiyama, the same inventors as the inventors of this divisional application, filed on 15 May 2007, which application claims priority from International Application PCT/JP2005/020289 dated 4 Nov. 2005 and Japanese Application No. JP 2004-351558 dated 3 Dec. 2004.

TECHNICAL FIELD

The present invention relates a storage device and a computer-readable medium, and particularly to a storage device and a computer-readable medium that efficiently store description information describing details of multimedia.

BACKGROUND ART

Owing to increase in capacity of movie recording devices and widespread use of fast/broad-band networks in recent years, a large amount of movies have been handled more often than ever, and therefore a manner for efficiently retrieving and managing movies has been required.

Intrinsically, a movie is searched for details of scenes contained therein. For such searching or retrieval, it is necessary to replay successively the movie and determine the details. However, this is not practical for a large amount of movies.

Therefore, description information describing details of movies are prepared in advance for each movie so that the movie retrieval can be performed based on the description information.

As disclosed in Japanese Patent Laying-Open Nos. 05-282379 (patent reference 1) and 08-110912 (patent reference 2), the description information is often configured as data having a tree structure for allowing easy retrieval.

FIG. 1 illustrates an example of conventional description information.

Referring to FIG. 1, a whole movie is formed of four scenes [1]-[4]. For each scene, the description information describes time information (start time and length) of the scene, a title of the scene and actors appearing in the scene.

Based on the above description information, a user can know that an actor "Keiko KUBO" appears in a scene [1], and can reproduce the scene [1] in which "Keiko KUBO" appears, from the whole movie according to the time information of "start time: 00:00:00, length: 3 mins" of the scene [1]. As described above, the description information is very effective at the movie retrieval.

FIG. 2 illustrates details of the description information data illustrated in FIG. 1.

Referring to FIG. 2, the actual description information is given as data strings, and each of items in each scene is individually described as the data. The individual data describing details of each item such as names of actors will be referred to as a "keyword".

Patent reference 1: Japanese Patent Laying-Open No. 05-282379
Patent reference 2: Japanese Patent Laying-Open No. 08-110912

DISCLOSURE OF THE INVENTION

Problems to be Solved by the Invention

However, from the keywords in the description information illustrated in FIG. 1, and particularly from the keywords representing the actors, it can be seen that some of the actors appears in a plurality of scenes.

More specifically, even when a keyword in a certain scene is the same as a keyword included in another scene, each of these keywords is recorded as an independent keyword so that the description information becomes redundant and large in total quantity.

The invention has been made for overcoming the above problem, and an object of the invention is to provide a storage device and a computer-readable medium that can efficiently store keywords included in description information.

Means for Solving the Problems

According to the invention, a storage device for storing description information describing details of multimedia contents and including a keyword, includes a description information converter providing a converted description information by converting the keyword in the description information into reference information for specifying the keyword; and a storage storing a list correlating the keyword with the reference information and the converted description information provided from the description information converter.

Preferably, the storage device further includes a list producing portion producing the list by extracting the keyword in the description information.

Preferably, the storage device further includes a position information extractor extracting position information indicating a position, in the multimedia contents, of the keyword to be converted into the reference information by the description information converter, and the storage further stores the position information extracted by the position information extractor.

Preferably, the list producing portion adds the position information extracted by the position information extractor to the list in such a fashion that the position information is correlated with the keyword.

Preferably, the list producing portion adds the position information extracted by the position information extractor to the list in such a fashion that the position information is correlated with the reference information specifying the keyword.

Preferably, the description information converter converts, in addition to the reference information, the position information indicating another position of the same keyword in the multimedia contents as the keyword to be converted into the reference information, based on the position ifformation extracted by the position information extractor.

Preferably, the description information converter converts a list correlating the keyword with the reference information in addition to the description information.

According to the invention, a storage device for storing description information describing details of multimedia contents and including keywords, includes a description information converter converting each of a plurality of the same keywords included in the description information except for at least one of the same keywords into reference information specifying the above at least one keyword; and a storage storing the converted description information provided from the description information converter.

Preferably, each of the at least one keyword in the description information bears ID information representing itself, and the reference information specifies the at least one keyword by indicating the ID information.

According to the invention, a computer-readable medium bears description information describing details of multimedia contents and including a keyword. The description information includes description data describing details of the multimedia contents using reference information for specifying the keyword instead of using the keyword; and a list correlating the keyword with the reference information.

Preferably, the description information further includes position data representing a specific position, in the multimedia contents, of each of the keywords described using the reference information.

Preferably, the position data is added to the list in such a fashion that the position data is correlated with each of the keywords.

Preferably, the position data is correlated with the reference information specifying each of the keywords in the list.

Preferably, the description data includes position data representing a specific position, in the multimedia contents, of the same keyword as the keyword described using the reference information.

Preferably, the description data includes a list correlating the keyword with the reference information.

According to the invention, a computer-readable medium bears description information describing details of multimedia contents and including a keyword. The description information is formed by replacing each of a plurality of the same keywords included in the description information except for at least one of the same keywords with reference information specifying the at least one of the keywords.

Preferably, each of the above at least one keyword in the description information includes ID information representing itself, and the reference information specifies the at least one keyword by indicating the ID information.

Effects of the Invention

According to the invention, since the details of the multimedia contents are described using the reference information specifying the keyword included in the description information instead of using the keyword, the data quantity of the keywords included in an overlapping fashion can be reduced to a data amount of the reference information, and the data of the whole description information can be reduced. Therefore, the keywords included in the description information can be efficiently stored.

BRIEF DESCRIPTION OF THE DRAWINGS

FIG. 2 illustrates details of the description information data illustrated in FIG. 1.

FIG. 5 illustrates the keyword list obtained after all the description information in FIG. 1 is processed.

FIG. 11 shows an example of a credit list annexed to the movie.

DESCRIPTION OF THE REFERENCE SIGNS 2 and 52 keyword determining portion, 4 and 54 position information extractor, 6 and 56 list producing portion, 8 and 58 description information converter, 10 and 60 storage, 12 description information producing device, 20 CPU, 28 interface, 30 communications device, 32 input, 34 output, 36 bus, 40 computer, 100, 102 and 104 storage device, 201, 301, 408, 414, 508 and 902 ID information, 202 and 410 keyword value, 203 and 416 scene information, 400 and 500 description information, 402, 502 and 902 reference information, 406 credit list, 412 keyword list, 504 link information, 506 entry list

BEST MODES FOR CARRYING OUT THE INVENTION

Embodiments of the invention will now be described with reference to the drawings. The same or corresponding portions bear the same reference numbers, and description thereof is not repeated.

[First Embodiment]

Figure 3:
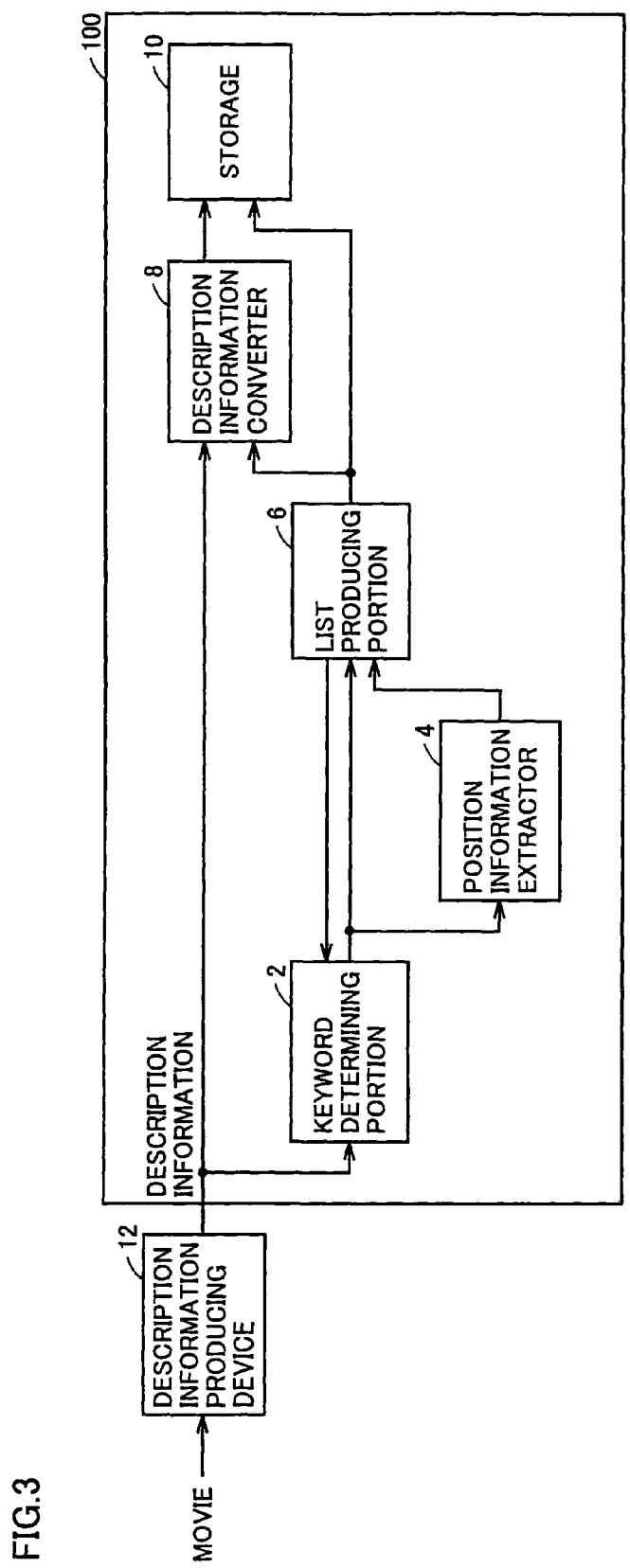
FIG. 3 shows a schematic structure of a storage device according to a first embodiment of the invention.

FIG. 3 shows a schematic structure of a storage device 100 according to a first embodiment.

Referring to FIG. 3, a storage device 100 receives description information from a description information producing device 12. When a movie already including the description information is provided, description information producing device 12 can be eliminated. Storage device 100 is formed of a keyword determining portion 2, a position information extractor 4, a list producing portion 6, a description information converter 8 and a storage 10.

Keyword determining portion 2 determines whether a keyword included in the externally received description information is present in a keyword list received from list producing portion 6 or not. When the keyword included in the externally received description information is not present in the keyword list, keyword determining portion 2 provides the keyword in question and an instruction for newly registering this keyword to list producing portion 6. When the keyword included in the externally received description information is present in the keyword list, keyword determining portion 2 provides information specifying the keyword in the keyword list and an instruction for additionally registering this keyword, to list producing portion 6. The keyword that is determined to be registered is provided to position information extractor 4 by keyword determining portion 2.

From the description information, position information extractor 4 extracts data representing scene information as to where the keyword that is provided from keyword determining portion 2 for the new registration or additional registration is contained, and provides the extracted data to list producing portion 6.

List producing portion 6 produces a keyword list that correlates the keyword with the scene information as to where the keyword in question is contained. When list producing portion 6 receives the keyword and the instructions for newly registering the received keyword from keyword determining portion 2, it registers the keyword in the keyword list, and further registers the scene information received from position information extractor 4 in a fashion related to the registered keyword. When list producing portion 6 receives the information specifying the keyword and the instructions for additionally registering the received keyword from keyword determining portion 2, it adds the scene information received from position information extractor 4 to the list in a fashion related to the keyword. Further, list producing portion 6 provides the keyword list thus produced to description information converter 8 and storage 10.

Description information converter 8 converts the keyword that is among the keywords in the externally received description information and particularly is included in the keyword list received from list producing portion 6. By this conversion, description information converter 8 produces the reference information for specifying the keyword in the keyword list received from list producing portion 6, and provides the converted description information to storage 10.

Storage 10 stores the converted description information provided from description information converter 8 and the keyword list provided from list producing portion 6.

Description information producing device 12 produces the description information from the movie provided thereto. For example, description information producing device 12 may be configured to analyze the input movie, e.g., using a movie recognizing technology, and thereby produce the description information, or may be configured such that a user provides the description information while recognizing the movie.

(Keyword List Producing Processing)

Storage device 100 according to the first embodiment receives the conventional description information illustrated in FIG. 1, and produces the keyword list as described below.

Figure 1:
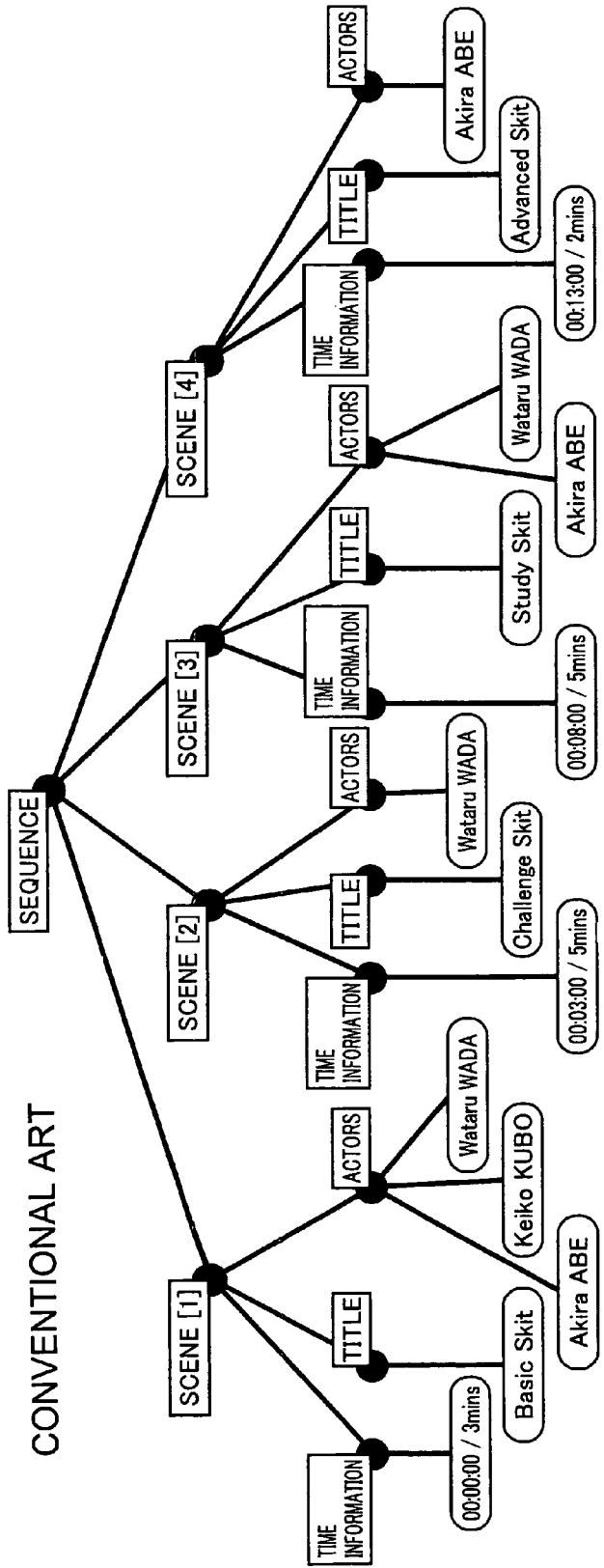
FIG. 1 illustrates an example of conventional description information.

Referring to FIG. 1, the keywords representing the actors describes specific names of the actors, and the same data repetitively appears in a plurality of scenes:

Therefore, for retrieving scenes in which the same actor "Wataru WADA" appears, it is necessary to determine throughout the description information whether the keyword "Wataru WADA" is present or not. Therefore, the retrieval requires a long time, and lowers a performance for other processing during the retrieval processing. Accordingly, processing is performed to produce a keyword list additionally including information about positions where the same keywords are present.

According to the first embodiment, processing is performed primarily on the keywords that may repetitively appear in the description information. The processing is performed on some other items such as "character names", i.e., names of characters in the movie and "object names", i.e., names of objects appearing in the movie.

In an ordinary case, it is merely required to perform the keyword determination on the same items, and the determination on different items is not required, e.g., for the following reason. Since each actor is assigned a character name in a play or the like, each keyword stored in the "character names" differs from any keyword stored in the "actors" except for the case where the actor's name is used as the character name as it is.

Figure 4:
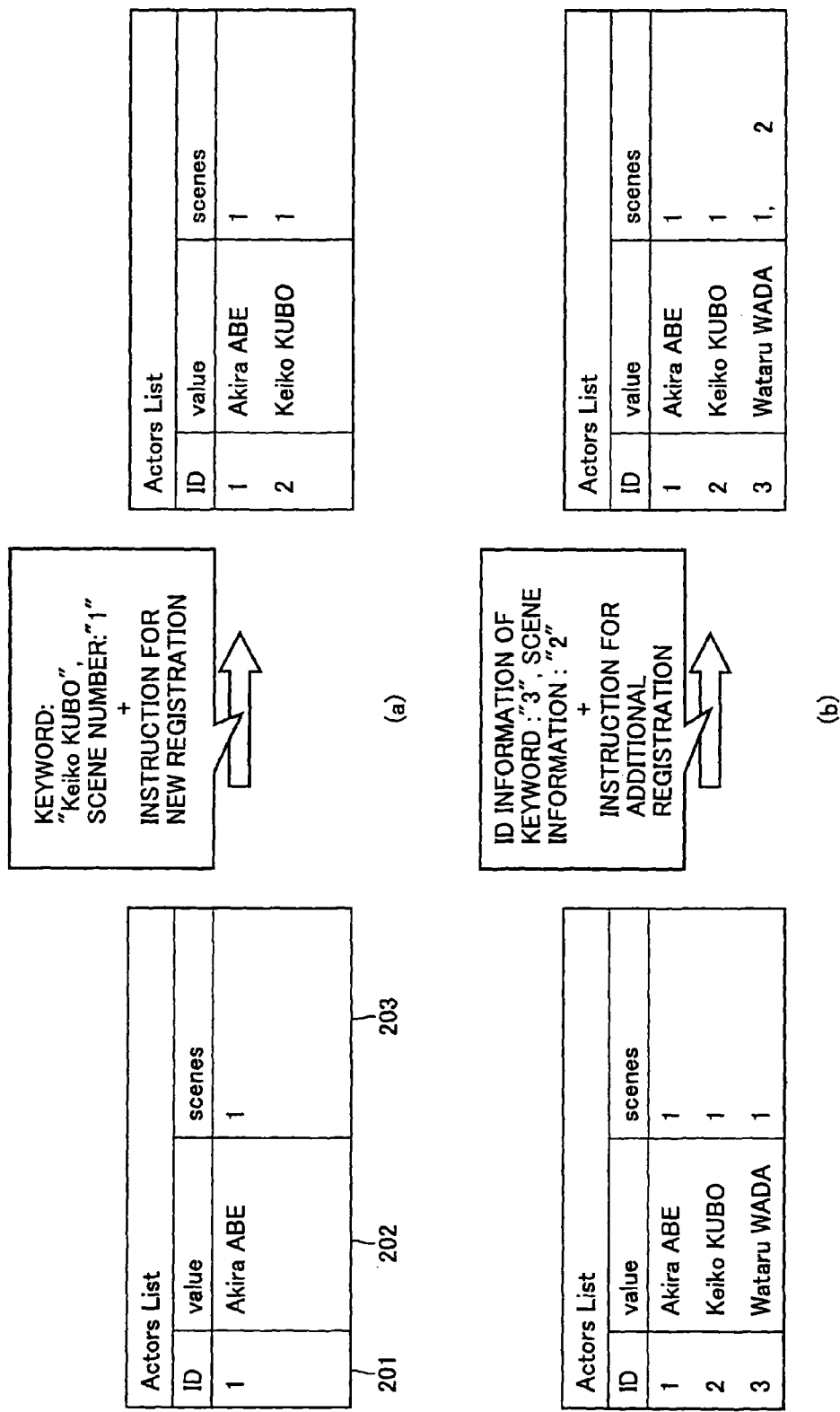
FIG. 4 illustrates an example of a keyword list produced by a list producing portion.

FIG. 4 illustrates an example of a keyword list produced by list producing portion FIG. 4(*a*) represents new registration in the keyword list.

FIG. 4(*b*) represents additional registration in the keyword list.

Referring to FIG. 4(*a*), list producing portion 6 produces an ID information 201, a keyword value (value) 202 and scene information (scenes) 203.

ID information 201 stores information for specifying the keywords included in the list.

Keyword value 202 stores the keywords.

Scene information 203 stores information about scenes in which the keywords stored in keyword value 202 are present.

FIG. 4(*a*) relates to the description information in FIG. 1, and particularly illustrates a change in keyword list that occurs when a second keyword "Keiko KUBO" is provided to storage device 100 that is already provided with an initial keyword "Akira ABE" described in the item of the actors.

Referring to FIGS. 3, 4(*a*) and 1, when the second keyword "Keiko KUBO" described in the item of the actors is provided to storage device 100, keyword determining portion 2 provides the keyword "Keiko KUBO" and an instruction for newly registering to list producing portion 6 because this keyword "Keiko KUBO" is not present in the keyword list received from list producing portion 6. Also, keyword determining portion 2 provides the keyword "Keiko KUBO" to position information extractor 4.

Position information extractor 4 receives the keyword "Keiko KUBO" determined by keyword determining portion 2, extracts the scene information storing this keyword and provides a scene number "1" to list producing portion 6.

List producing portion 6 performs new registration in the keyword list according to the keyword "Keiko KUBO" received from keyword determining portion 2 and the instruction for new registration as well as the scene number "1" received from position information extractor 4.

Thereby, the keyword "Keiko KUBO" and the scene number "1" are stored in the keyword list produced by list producing portion 6 with an ID number "2".

FIG. 4(*b*) relates to the description information illustrated in FIG. 1, and particularly illustrates the change in keyword list that occurs when a keyword "Wataru WADA" of a scene [2] is provided in such a state that all the keywords stored in the item of the actors of the scene [1] are already provided to storage device 100.

Referring to FIGS. 3, 4(*b*) and 1, when an initial keyword "Wataru WADA" stored in the item of actors of the scene [2] is provided to storage device 100, keyword determining portion 2 provides an ID number "3" and an instruction for additional registration to list producing portion 6 because the keyword "Wataru WADA" is present at the ID number "3" in the keyword list received from list producing portion 6. Keyword determining portion 2 provides the keyword "Wataru WADA" to position information extractor 4.

Position information extractor 4 receives keyword "Wataru WADA" determined by keyword determining portion 2, extracts the scene information storing the keyword and provides a scene number "2" to list producing portion 6.

List producing portion 6 stores the scene number "2" in the row designated by the ID number "2" received from keyword determining portion 2.

Thereafter, list producing portion 6 produces the keyword list from the externally provided description information in a similar manner.

FIG. 5 illustrates the keyword list obtained after all the description information in FIG. 1 is processed.

FIG. 5(*a*) illustrates a list form.

FIG. 5(*b*) illustrates the details of the list illustrated in FIG. 5(*a*) in a form of description information.

Referring to FIG. 5(*a*), list producing portion 6 produces a list that relates to the keywords stored in the item of the actors included in the description information illustrated in FIG. 1, and this list correlates each keyword with the scene information storing the keyword in question.

Referring to FIG. 5(*b*), list producing portion 6 may provide the details of the list illustrated in FIG. 5(*a*) in the description information form.

In the foregoing description, the scene numbers allocated to the respective scenes are handled as the position information to be handled as the scene information in the contents. For example, when a multi-level or hierarchical structure in which each scene is subdivided into sub-scenes, two-dimensional data (M, N) representing a sub-scene N of a scene M may be handled as the scene information (position information).

An expression form of "/scene M/sub-scene N" representing a path in the tree structure may be handled as the scene information (position information). Further, a start time of the like of the scene may be handled as the position information.

In the above example, ID information 301 of the keywords is formed of consecutive numbers assigned to the respective keywords. However, another information may be employed provided that it can distinguish each keyword from the others. Further, ID information 301 is not essential, and the list may consist of only a keyword value 302 and scene information 303. In this case, keyword value 302 itself is used as the information for the keyword distinction.

The purpose of producing the keyword list in FIG. 5(*a*) is to avoid overlapping of the same keywords recorded in the description information and to avoid increase in data quantity due to such overlapping. Therefore, the data quantity can not be effectively reduced in connection with a keyword such as "Keiko KUBO" that appears only once in the description information as illustrated in FIG. 5(*a*). Accordingly, list producing portion 6 may perform the processing of eliminating the keywords not overlapping in the description information from the list.

Keyword determining portion 2 may receive the description information in which each keyword has already born a flag indicating whether the keyword is to be registered in the keyword list or not, and thereby may determine according to the flag whether the keyword is to be registered in the keyword list or not. For example, keyword determining portion 2 receives, for each keyword included in the description information, the description information bearing a flag indicating that the keyword in question appears only once in the description information or that it appears multiple times, and determines according to the value of the flag not to register the keyword appearing only once in the keyword list. Thereby, the keyword appearing only once does not require the determination with respect to the keyword registered in the keyword list so that the processing can be performed faster.

Further, the order of the keywords in the keyword list produced by list producing portion 6 may be the same as that of the appearance in the description information, but the keywords may be arranged in the dictionary order (the alphabetical order or the order of the Japanese syllabary). It can be expected that the arrangement of the keywords in the dictionary order can further improve the retrieval efficiency.

(Conversion Processing of Description Information)

Figure 6:
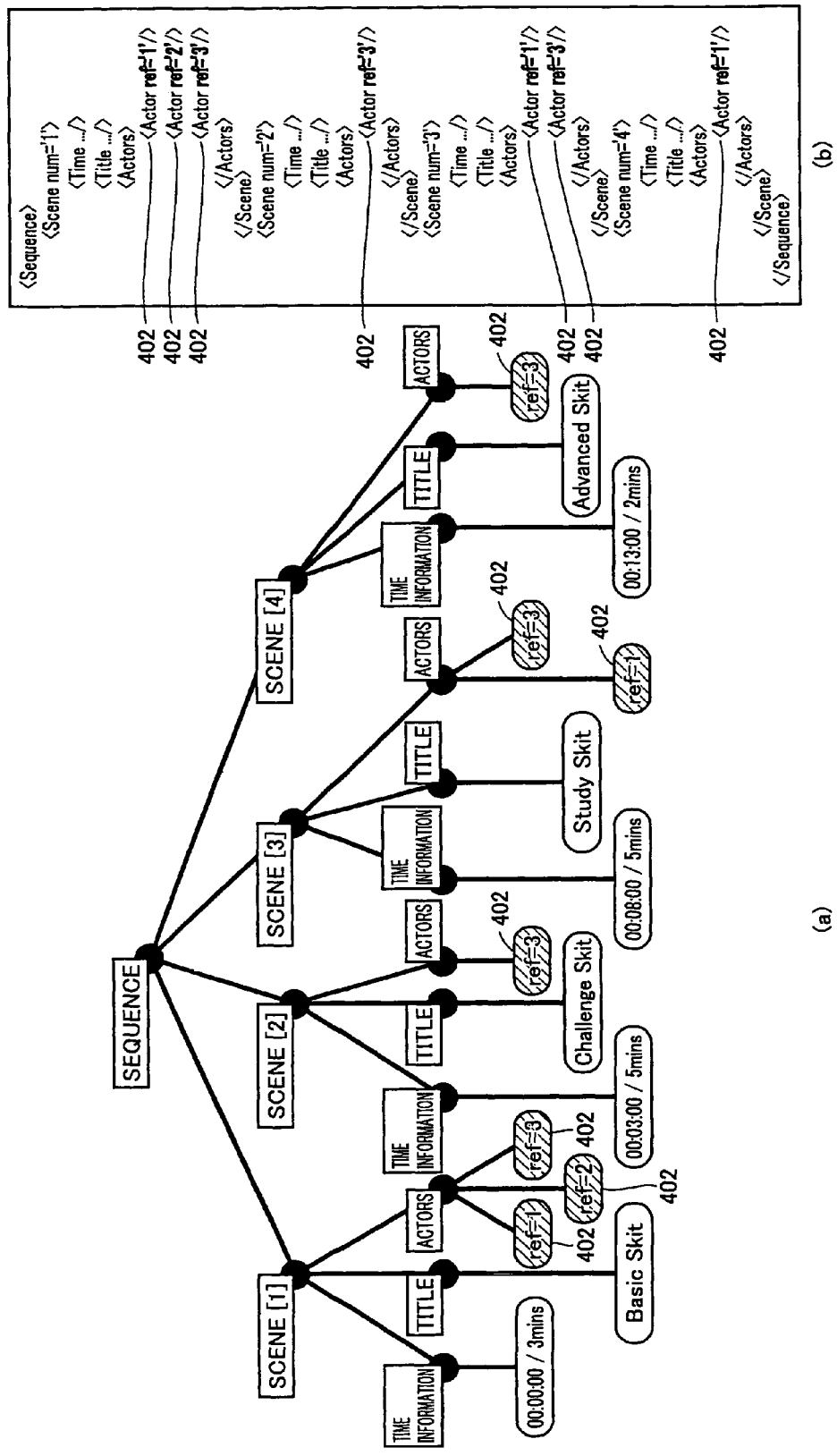
FIG. 6 illustrates the description information obtained after the keywords in the description information in FIG. 1 are converted into the reference information.

FIG. 6 illustrates description information prepared by converting the keywords in the description information illustrated in FIG. 1 into the reference information. In FIG. 6, the portions converted from those in the description information illustrated in FIG. 1 are illustrated in an enhanced forms.

FIG. 6(*a*) illustrates a tree structure.

FIG. 6(*b*) illustrates the description information of the tree structure illustrated in FIG. 6(*a*) in a data form.

Referring to FIGS. 3, 5(*a*) and 6(*a*), description information converter 8 receives the keyword list from list producing portion 6, and converts the keywords included in the externally provided description information into reference information 402 used for specifying the keywords in question in the keyword list. Description information converter 8 provides the converted description information to storage 10.

In the first embodiment, the ID number stored in ID information 301 in the keyword list illustrated in FIG. 5(*a*) is used as reference information 402.

As described above, by using the keyword list produced by list producing portion 6 and the description information converted into the reference information, the same details as those described in the original description information can be stored while reducing a data quantity.

When a plurality of lists are present, it is desired that the information for specifying the keyword list itself is employed as the reference information in addition to ID number 301 of the keyword list.

As the reference information, the position of the path in the description information format illustrated in FIG. 5(*b*) may be used instead of the foregoing ID number. Further, the keywords stored in the keyword list may employ actual data record positions (absolute addresses of data or relative addresses from a fixed position). When the list and the description information are recorded on the same record medium, the offset distances between the reference information and the keywords in the list may be employed.

Description information converter 8 that converts the keyword in the description information into the reference information may also convert the keyword into the keyword and the reference information. Thus, it may be configured to add the reference information while holding the keyword.

A comparison may be made between the data quantity of the keywords and the data quantity of the reference information, and the keywords or the reference information having a smaller data quantity may be used so that the whole data quantity can be reduced. Accordingly, description information converter 8 may be configured to select the operation, i.e., to convert each keyword to the reference information or to use the keyword as it is, before converting the keyword into the reference information. In this case, it is desired that the description information additionally includes additional information such as a flag indicating that the keyword data itself is recorded, or that the converted reference information is recorded.

(Whole Processing Flow of Storage Device)

Figure 7:
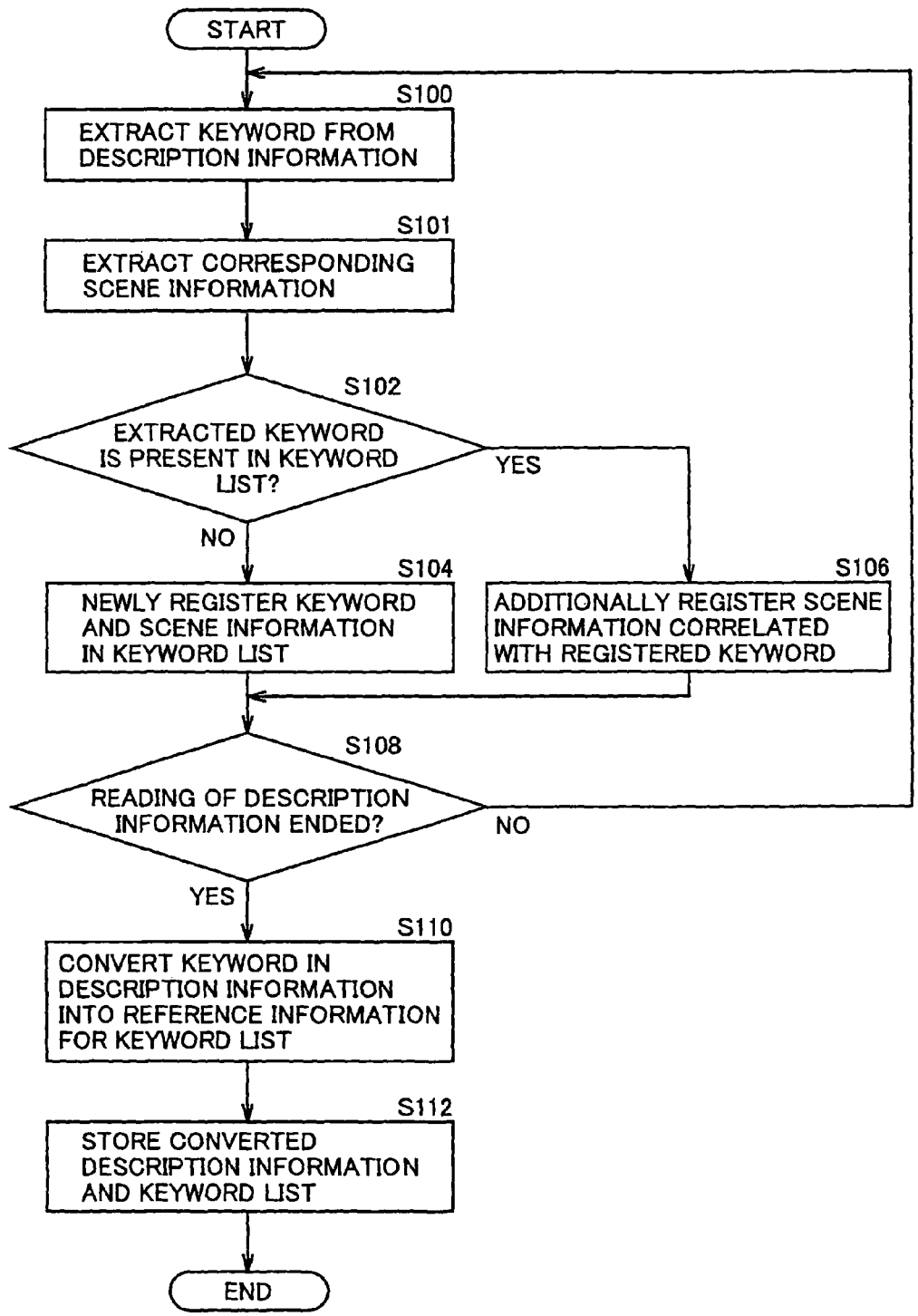
FIG. 7 is a flowchart illustrating processing of the storage device.

FIG. 7 is a flowchart illustrating the processing of storage device 100.

Referring to FIG. 7, keyword determining portion 2 extracts the keyword from description information, and provides the extracted keyword to position information extractor 4 (step S100).

Position information extractor 4 extracts the scene information corresponding to the keyword provided from keyword determining portion 2 (step S101). Position information extractor 4 provides the extracted scene information to list producing portion 6.

Keyword determining portion 2 determines whether the extracted keyword is present in the keyword list received from list producing portion 6 or not (step S102).

When the extracted keyword is not present in the keyword list (NO in step S102), keyword determining portion 2 provides the keyword and an instruction for newly registering the keyword to list producing portion 6. Thereby, list producing portion 6 newly registers the keyword received from keyword determining portion 2 and the scene information received from position information extractor 4 in the keyword list (step S104).

When the extracted keyword is present in the keyword list (YES in step S102), keyword determining portion 2 provides the information specifying the keyword in question and the instruction for additionally registering the keyword to list producing portion 6. Thereby, list producing portion 6 additionally registers the scene information received from position information extractor 4 in a fashion related to the keyword that is already registered and is specified by the specifying information received from keyword determining portion 2 (step S106).

Since no keyword is registered in the initial state, the keyword that is first read is always newly registered.

List producing portion 6 determines whether the reading of the description information has ended or not (step S108).

When the reading of the description information has not ended (NO in step S108), list producing portion 6 provides an instruction for continuing the keyword extraction. Thereby, keyword determining portion 2 continues the keyword extraction from the description information (step S100).

When the reading of the description information has ended (YES in step S108), list producing portion 6 notifies description information converter 8 of the end of the description information reading, and provides the produced keyword list to storage 10. Thereby, description information converter 8 converts the keyword data in the externally provided description information into the reference information for the keyword list, and provides it to storage 10 (step S110).

Storage 10 stores the converted description information provided from description information converter 8 as well as the keyword list provided from list producing portion 6 (step S112).

(Retrieval of Description Information)

Description will now be given on the case where the movie retrieval is performed using the description information stored in a storage 100 according to the first embodiment.

Figure 8:
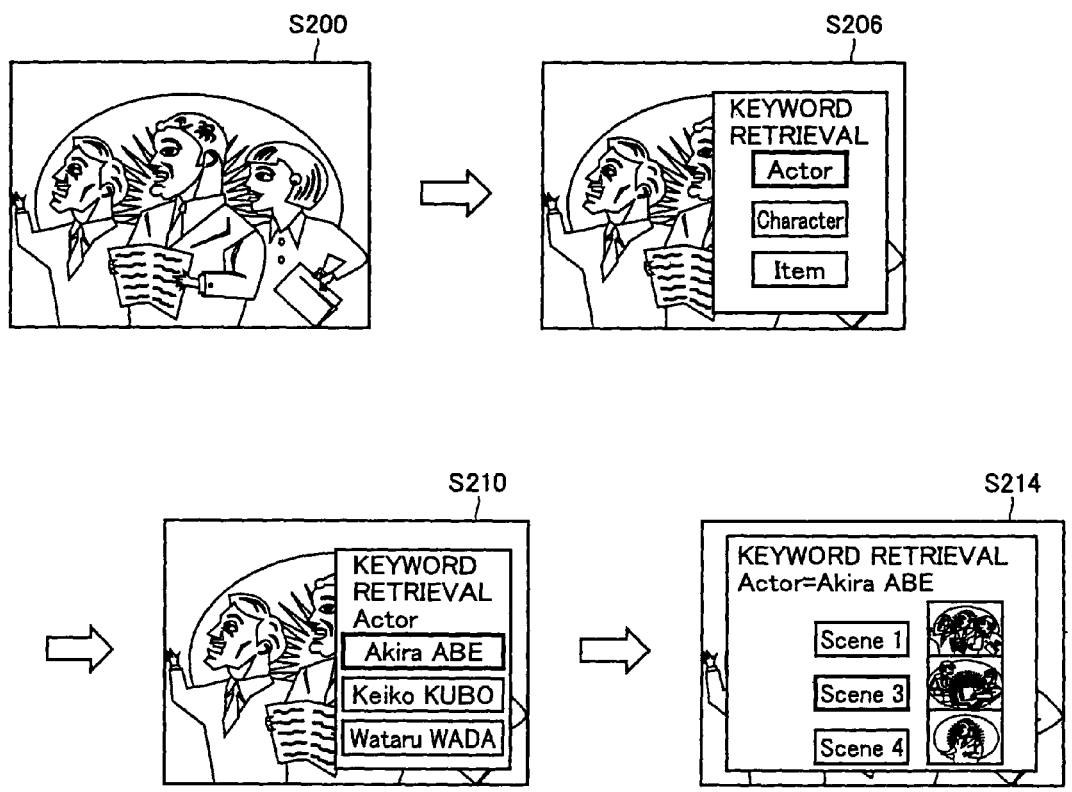
FIG. 8 illustrates an example of a display for performing movie retrieval.

FIG. 8 illustrates an example of a display for performing the movie retrieval.

Figure 9:
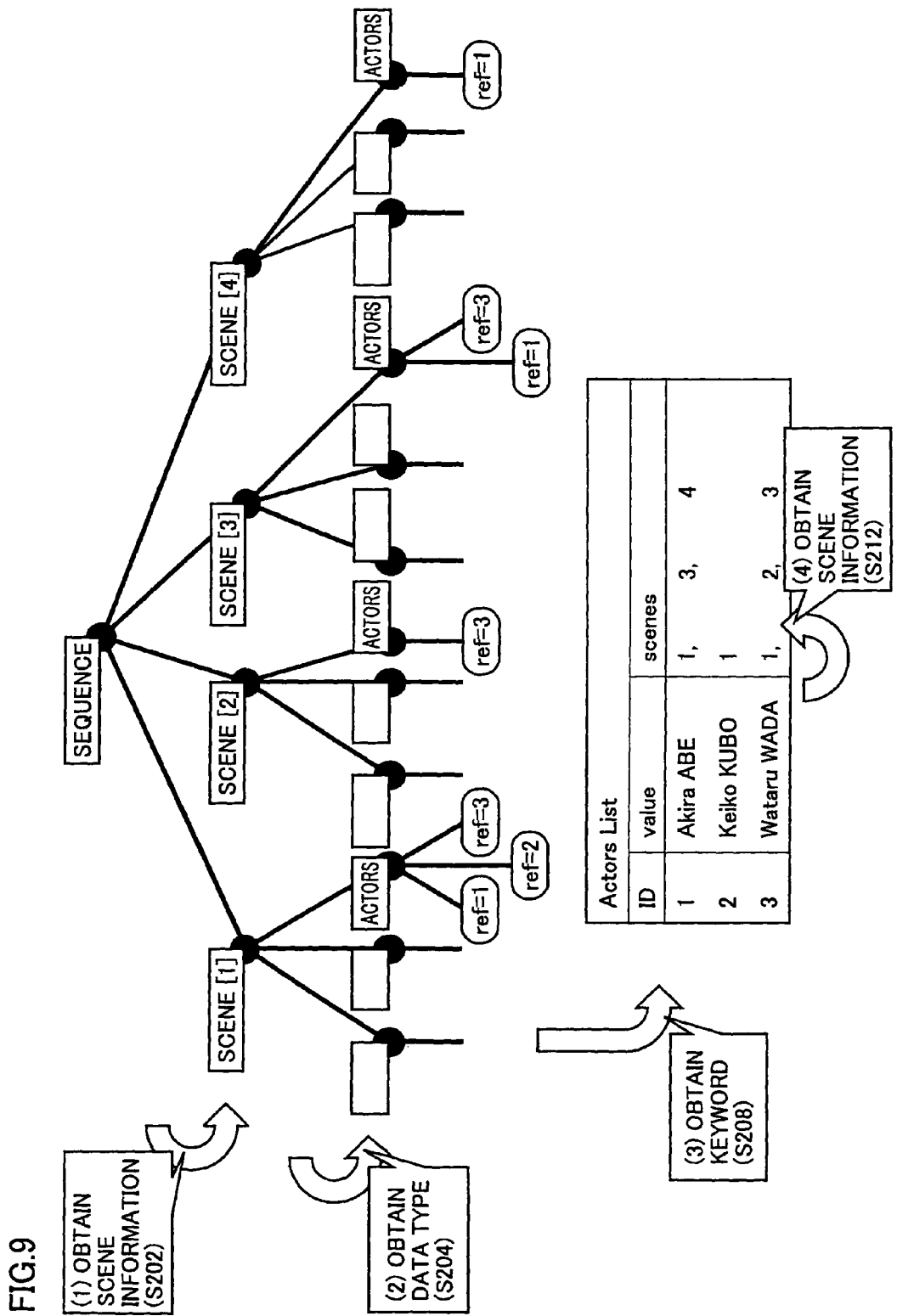
FIG. 9 illustrates a manner of referring to the description information and the keyword list.

FIG. 9 illustrates a manner for referring to the description information and the keyword list.

Referring to FIGS. 8 and 9, the user provides an instruction for starting a retrieval process while an intended scene is being replayed or paused (step S200). The retrieval process thus started obtains the scene information at the time of reception of the user's start instruction (step S202). The retrieval process obtains a data type included in the obtained scene (step S204). Further, the retrieval process describes a retrieval display according to the obtained data type (step S206).

The user selects the data type used for the retrieval on the display. For example, the user selects the data type of the actor. Thereby, the retrieval process obtains the keywords included in the selected data type (step S208). Further, the retrieval process describes the keywords included in the selected data type on the retrieval display (step S210).

Further, the user selects the intended keyword. For example, the user selects the keyword "Akira ABE". Thereby, the retrieval process obtains the scene information in the description information containing the selected keyword (step S212). The retrieval process displays the scene including the keyword selected by the user, based on the obtained scene information (step S214).

Finally, the user selects the intended scene for replay. For example, the user selects a scene [3].

Through the above retrieval steps, the user can replay the intended scene.

In the foregoing first embodiment, as illustrated in FIG. 1, the description information includes, for each scene, the time information (start time and length), the title and the information of the actors appearing in the scene. However, the structure and details of the description information are not restricted to the above. For example, the description information may have a multi-level or hierarchical structure in which each scene is subdivided into sub-scenes. Also, the description information may additionally include, as the information belonging to the scene, feature information such as a representative color and a degree of motion, in addition to text information such as a commentary. Instead of the tree that represents one movie as a whole, a tree structure may be configured such that a root node (highest node) represents all programs broadcasted on one channel, divided nodes at the first level represent the programs, respectively, and each of divided nodes at the second level represents the scene included in the program.

As illustrated in FIG. 3, it has been described that the description information that is prepared in advance is received and converted. However, the process may be configured to perform the analysis in the same stage as the production of the description information, and to perform simultaneously the production of the keyword list and the conversion into the reference information.

According to the first embodiment, the details of the multimedia contents are described using the reference information specifying the keywords instead of using the keywords included in the description information. Therefore, the data quantity of the keywords that are included in the description information in the overlapping fashion can be reduced to the data quantity of the reference information, and the data quantity of the whole description information can be reduced. Accordingly, the keywords included in the description information can be efficiently stored.

According to the first embodiment, the keyword list stores all the scene information including the keywords. Therefore, even when the keyword included in the overlapping fashion in the description information is to be retrieved, the scene information including the keyword in question can be obtained using the keyword list. Accordingly, it is not necessary to search the whole description information for the keyword, and the retrieval can be performed efficiently and rapidly.

According to the first embodiment, it is not necessary to reregister the keyword included in the description information that is once registered in the keyword list. Therefore, the description information can be prepared while avoiding such a problem that an intended scene cannot be retrieved due to misspelling during entry of the same keyword. Accordingly, it is possible to prevent lowering of the retrieval precision that may be caused by a mistake in entry during production of the description information. Further, the keywords included in the description information can be edited only by editing the details of the keyword list so that the description information can be efficiently edited.

[Second Embodiment]

The first embodiment has been described in connection with the case where the keywords are extracted from description information to produce the keyword list.

A second embodiment will now be described in connection with the case where a list formed of keywords included in description information is provided in advance.

In some cases, movie contents include, as production information, a credit list including a list of actors of the movie and the like.

When the credit list is annexed, the keyword list is not produced, and reference information referring to the annexed list is used.

Figure 10:
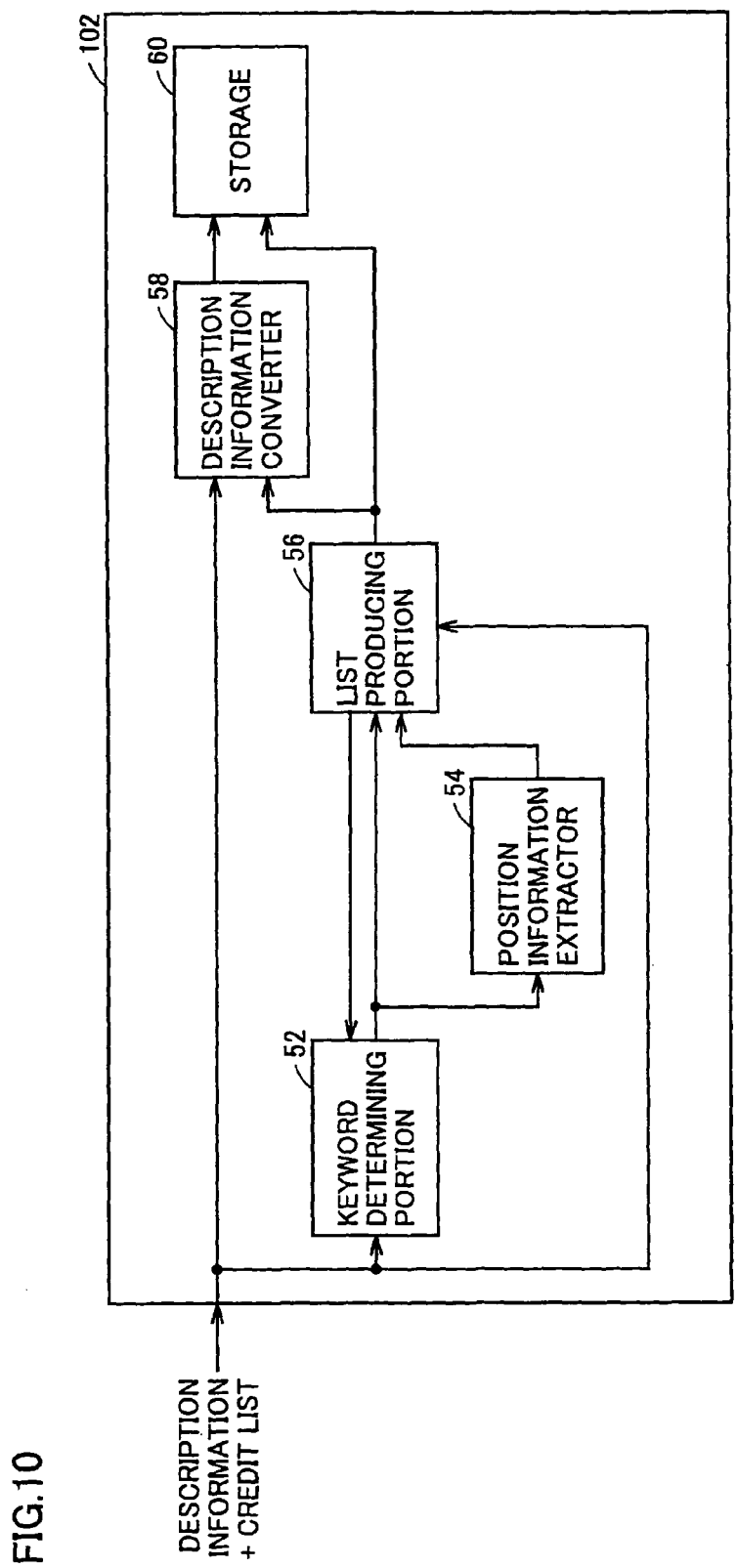
FIG. 10 schematically shows a structure of a storage device according to a second embodiment of the invention.

FIG. 10 schematically shows a structure of a storage device 102 according to a second embodiment.

Referring to FIG. 10, storage device 102 externally receives the description information and the credit list. Storage device 102 is formed of a keyword determining portion 52, a position information extractor 54, a list producing portion 56, a description information converter 58 and a storage 60.

Keyword determining portion 52 extracts the keyword included in the externally received description information, and obtains the reference information that specifies the extracted keyword in the externally received credit list. Keyword determining portion 52 provides this reference information to list producing portion 56 and position information extractor 54.

Position information extractor 54 receives the keyword determined by keyword determining portion 52, extracts the data, representing scene information storing this keyword, from the description information and provides it to list producing portion 56.

List producing portion 56 externally receives the credit list. List producing portion 56 produces a keyword list that correlates the reference information specifying the keywords in the credit list with the scene information storing the keywords. List producing portion 56 adds the scene information received from position information extractor 54, and correlates it with the reference information received from keyword determining portion 52. Further, list producing portion 56 provides the keyword list thus produced to storage 60.

Description information converter 58 replaces the keywords that are included in the externally received description information and particularly are included in the externally received credit list with the reference information for specifying the keywords in the credit list. Description information converter 58 provides the converted description information to storage 60.

Storage 60 stores the converted description information provided from description information converter 58 as well as the keyword list provided from list producing portion 56.

FIG. 11 illustrates an example of the credit list annexed to the movie.

Referring to FIG. 11, the keywords included in the items of the description information are stored on an item-by-item basis.

Figure 12:
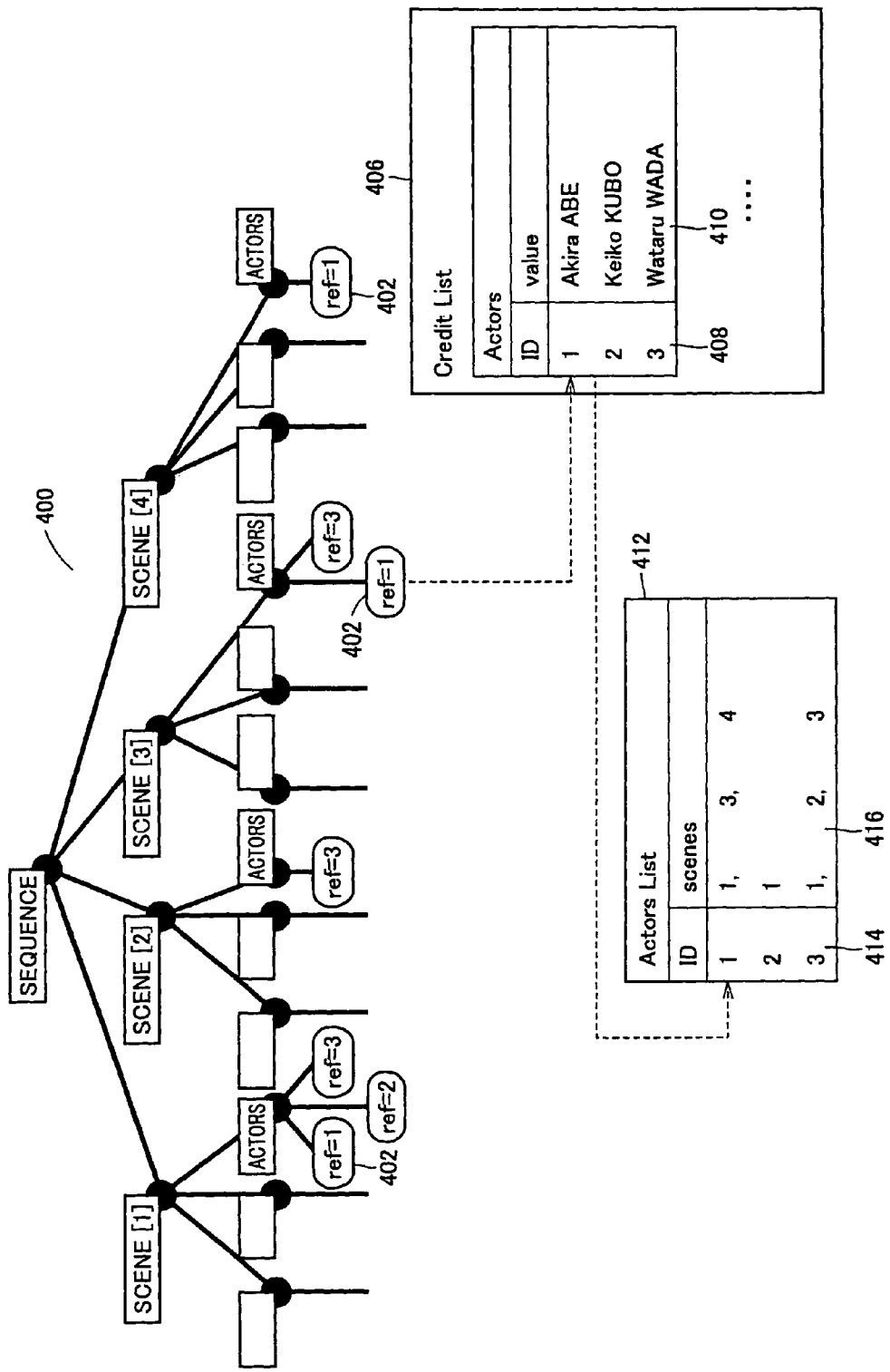
FIG. 12 illustrates examples of description information, the credit list and a keyword list according to the second embodiment of the invention.

FIG. 12 illustrates examples of description information 400, a credit list 406 and a keyword list 412 according to the second embodiment.

Referring to FIGS. 10 and 12, credit list 406 is formed of ID information 408 and a keyword value 410. Description information converter 58 converts the keywords included in description information 400 into reference information 402 for specifying the keywords in credit list 406. Reference information 402 is ID information 408 in credit list 406.

Therefore, the keyword of keyword value 410 included in credit list 406 can be specified using reference information 402.

Keyword list 412 is formed of ID information 414 that is the same as ID information 408 in credit list 406 as well as scene information 416. List producing portion 56 adds the scene information received from position information extractor 54 and correlates it to the reference information received from keyword determining portion 52.

Since reference information 402 specifying the keywords in credit list 406 and scene information 416 are recorded in a correlated fashion, ID information 408 of credit list 406 is obtained according to the keyword required by the user, and scene information 416, corresponding to ID information 414 that is the same as ID information 408 thus obtained, is obtained in keyword list 412. Thereby, the scene information containing the keyword in question can be retrieved.

Keyword list 412 includes ID information 414 for establishing the correlation with the keywords recorded in credit list 406. However, the keyword list may have the rows arranged in the same order relationship as the keywords in the credit list, whereby the ID information 414 can be eliminated.

According to the second embodiment, the keyword list is produced by correlating the reference information specifying the keywords in the credit list with the scene information so that the keyword list does not store the keywords. Therefore, even when the description information includes many keywords, the data quantity of the keyword list can be kept small. Accordingly, the data quantity of the whole description information including the keyword list can be small.

According to the second embodiment, it is not necessary to produce the keyword list by extracting the keywords from the description information so that the conversion processing of the description information can be performed fast.

[Third Embodiment]

The second embodiment has been described in connection with the case where the keyword list stores all the scene information items each including the keyword.

A third embodiment will now be described in connection with the case where the description information additionally includes information that specifies, for each keyword, the other scene(s) in which the same keyword is present.

A storage device according to the third embodiment has substantially the same structure as storage device 102 according to the second embodiment shown in FIG. 10, and therefore description thereof is not repeated.

Figure 13:
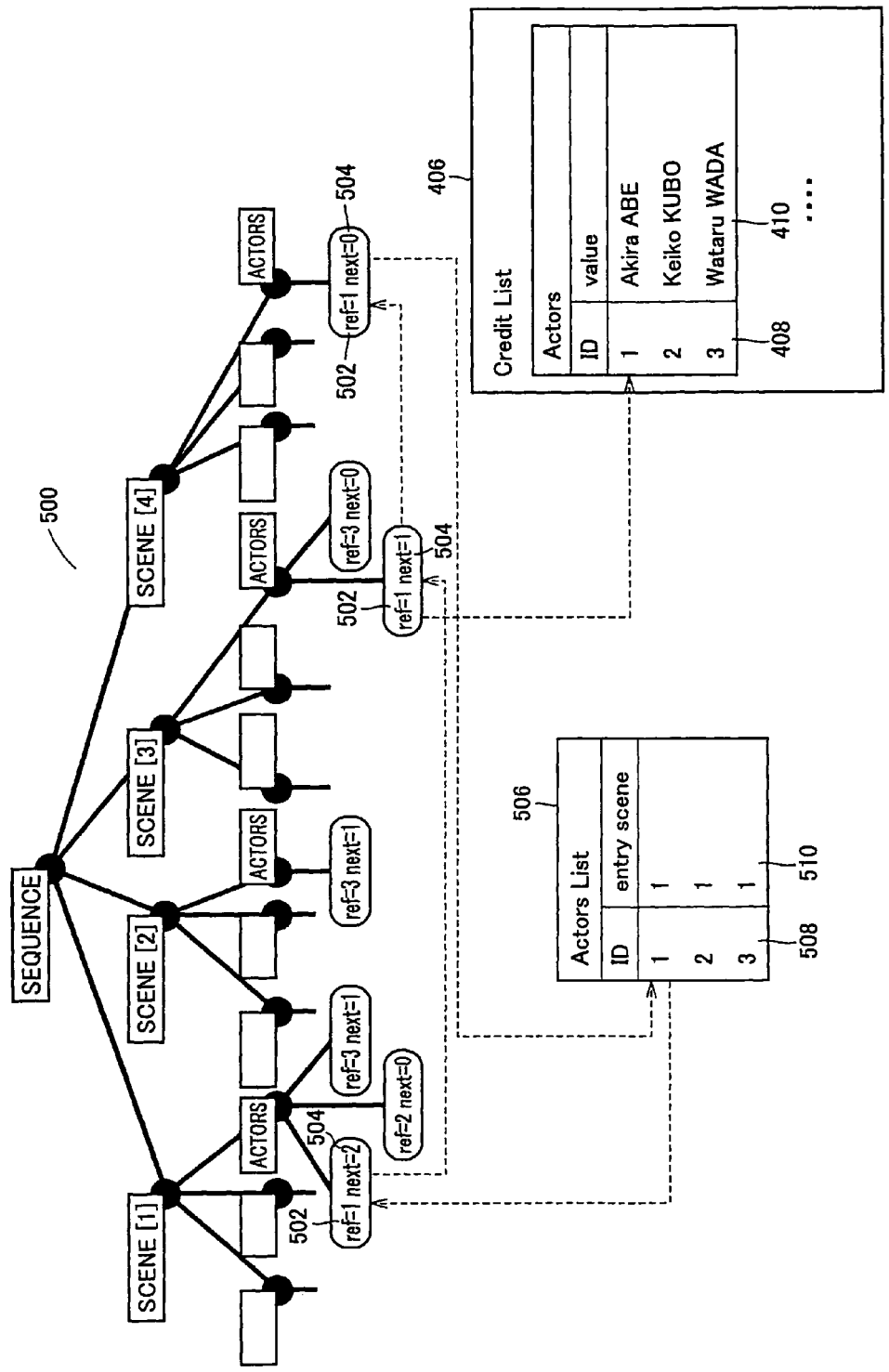
FIG. 13 illustrates examples of description information, a credit list and an entry list according to a third embodiment of the invention.

FIG. 13 illustrates examples of description information 500, credit list 406 and an entry list 506.

Credit list 406 is substantially the same as that in the second embodiment, and therefore description thereof is not repeated.

Referring to FIG. 13, the keyword included in description information 500 is converted into reference information 502 specifying the keyword in credit list 406 as well as link information 504 specifying the scenes where the same keyword is present.

Reference information 502 is ID information 408 for specifying keyword value 410 stored in credit list 406.

Link information 504 represents the scene information about the next scene in which the same keyword will appear. For example, link information 504 "next=2" is added to the keyword "Akira ABE" indicated by reference information 502 "ref=1" included in the scene [1]. This link information 504 "next=2" represents that the same keyword "Akira ABE" will appear in a second scene from the current scene. Thus, the scene [3] that is the second scene from the scene [1] includes the same reference information 502 "ref=1" for specifying the keyword "Akira ABE". Since link information 504 corresponding to reference information 502 "ref=1" included in the scene [3] is "next=1", the same keyword will appear in the next scene [4]. Link information 504 of reference information 502 "ref=1" included in the scene [4] is "next=0". Link information 504 "next=0" represents that the same keyword will not appear in the subsequent description information, and entry list 506 is referred to when link information 504 "next=0" is received.

Entry list 506 stores the scene information of the scenes each correlated with the keyword which appears first in the description information. In the foregoing example, when entry list 506 is referred to according to link information 504 "next=0", the entry point corresponding to the ID number "1" correlated with the keyword "Akira ABE" is the scene [1].

As described above, all the scenes including the keywords "Akira ABE" can be obtained by substantially circulating through description information 500 and entry list 506.

The link information may be required merely to indicate linkages about the scenes in which the same keyword is present. Alternatively, it may indicate next storage positions of the same keywords (specifically, of the reference information indicating the same keywords). Therefore, the link information may be provided by the path information of the tree, or may be implemented using the data positions (absolute/relative addresses) where the reference information is stored, or offset distances to the next reference information storage positions.

According to the third embodiment, the scene information containing the respective keywords is described in the description information so that the entry list has a constant size regardless of the data quantity of the description information. The scene information items described in the description information are mutually linked. Therefore, when the scenes including the same keyword are to be continuously retrieved, or in a similar case, the storage capacity can be reduced as compared with the case where all the scene information is to be obtained in advance.

[Fourth Embodiment]

In the first to third embodiments described above, the list correlating the keywords with the reference information is separated from the description information.

In a fourth embodiment described below, the description information contains the list correlating the keywords with the reference information.

A storage device according to the fourth embodiment has substantially the same structure as storage device 100 according to the first embodiment of the invention shown in FIG. 3, and therefore description thereof is not repeated.

Description information converter 8 in the fourth embodiment performs converting processing on each of the keywords registered in the keyword list produced by list producing portion 6, and particularly at one position of the description information such as a position where each of the keywords is first stored, and thereby converts the keyword into the keyword data itself and the reference information for specifying the keyword data. Further, description information converter 8 converts the keywords that are the same as the keyword in question but are present in different positions, and more specifically converts the same keywords in the description information into the reference information for specifying the keywords in question.

Figure 14:
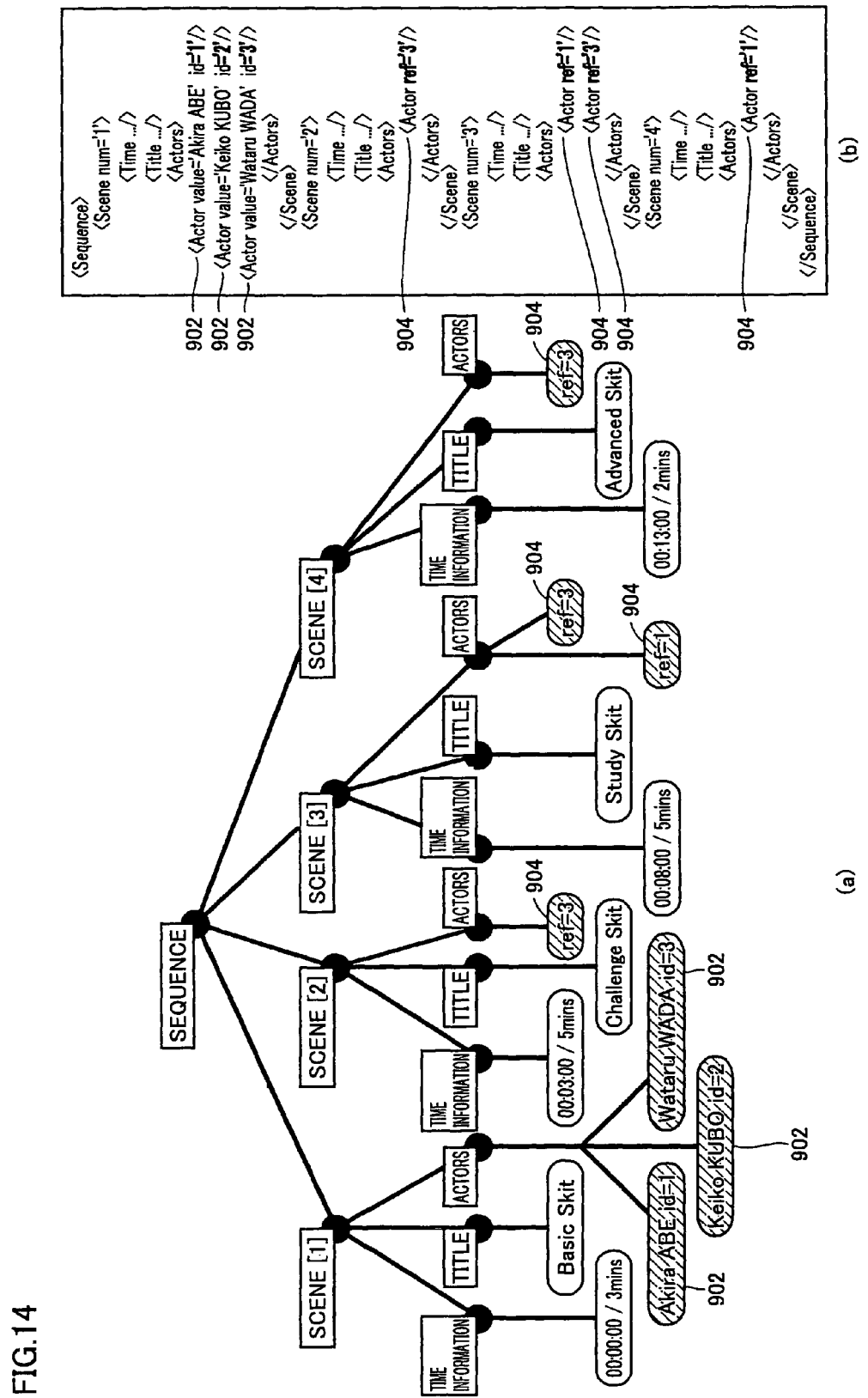
FIG. 14 illustrates an example of description information according to a fourth embodiment of the invention.

FIG. 14 illustrates a example of the description information according to the fourth embodiment.

Referring to FIG. 14, description information converter 8 adds ID information 902 for specifying the keywords "Akira ABE", "Keiko KUBO" and "Wataru WADA" for scene [1] where these keywords are first stored. Each of the keywords stored after the scene [1] is converted into reference information 904 correlated with ID information 902.

As described above, since the description information includes the list for storing the respective keywords and the reference information in the correlated fashion, it is not necessary to store each keyword in a separated fashion. Therefore, list producing portion 6 produces the keyword list formed of the reference information and the scene information, similarly to keyword list 412 illustrated in FIG. 12.

Further, storage 10 stores the description information provided from description information converter 8 and containing the list that correlates the keywords with the reference information, and also stores the keyword list provided from list producing portion 6 and correlating the reference information with the scene information.

In view of data error resistance, the same keyword and the same ID information may be described at a plurality of positions in the description information so that these can be referred to at each position.

According to the fourth embodiment, since it is not necessary to store the list of the keywords correlated with the reference information, the details of the movie can be described using only the data in the description information. Therefore, even when the description information for many movies is present, it is required to process only the reference information so that the information can be handled more easily than the case where the reference information and the lists are to be processed simultaneously.

According to the fourth embodiment, the data can be held without causing any change in format of the original description information. Therefore, a routine for newly interpreting a data format is not required, and the original description information and the converted description information can be handled in substantially the same manner.

[Fifth Embodiment]

Figure 15:
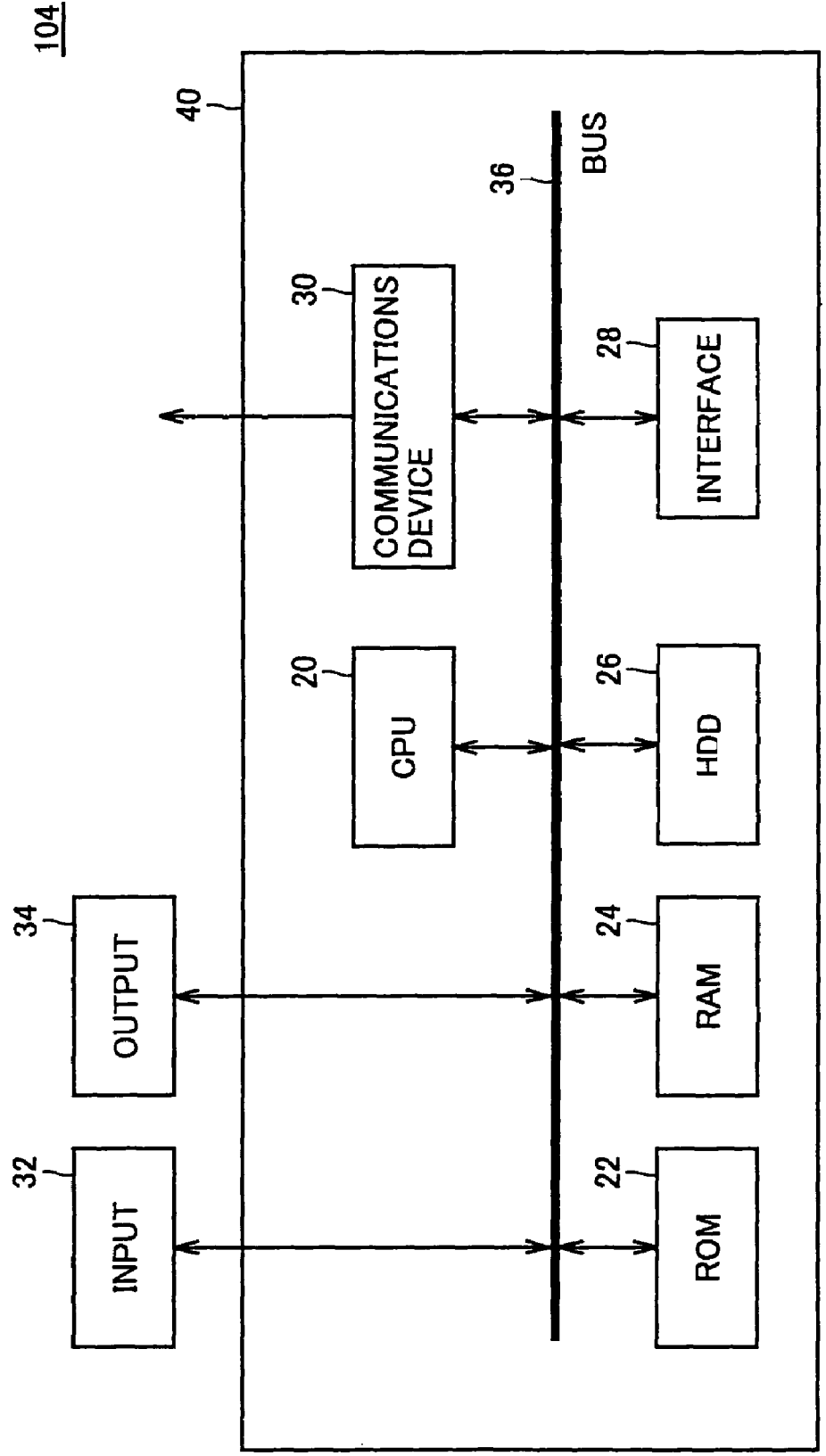
FIG. 15 shows a schematic structure of a storage device according to a fifth embodiment of the invention.

FIG. 15 schematically shows a structure of a storage device 104 according to a fifth embodiment of the invention.

Referring to FIG. 15, storage device 104 is formed of a computer 40, an input 32 and an output 34.

Computer 40 includes a CPU (Central Processing Unit) 20 executing programs, a ROM (Read Only Memory) 22, a RAM (Random Access Memory) 24 and an HDD (Hard Disk Drive) 26 for storing the programs and data, an interface 28 for connection to external record devices such as a DVD (Digital Versatile Disk) and a memory card, a communications device 30 for connection to various communications networks including the Internet, and a bus 36 for data transmission/reception between various sections and portions.

Input 32 is formed of a keyboard, a mouse, buttons and the like.

Output 34 is formed of a monitor, a speaker, a display and/or the like that display or output movies, sounds, characters and the like.

ROM 22, RAM 24 or HDD 26 stores a keyword determining program, a position information extracting program, a list producing program and a description information converting program that implement keyword determining portion 2 or 52, position information extractor 4 or 54, list producing portion 6 or 56 and description information converter 8 or 58 in storage device 100 or 102 according to the first to fourth embodiments, respectively. CPU 20 loads and executes the stored programs. Alternatively, the above various programs may be recorded on an external record medium of a computer-readable type, and the device may be configured to load the programs therefrom via interface 28 for executing the programs.

CPU 20 externally receives the description information, and stores it in RAM 24 or HDD 26.

CPU 20 executes the loaded keyword determining program. Thereby, CPU 20 reads the keywords included in the description information stored in RAM 24 or HDD 26, compares them with the keywords included in the keyword list stored in RAM 24 or HDD 26 and determines whether the keywords in question are registered or not.

CPU 20 executes the loaded position information extracting program, and extracts the scene information corresponding to the keywords.

CPU 20 executes the loaded list producing program, and operates according to the result of the determination by the keyword determining program to register newly or additionally the keywords and the scene information of the keywords in the list that is stored in RAM 24 or HDD 26.

Further, CPU 20 executes the loaded description information converting program. Thereby, CPU 20 converts the keywords in the description information stored in RAM 24 or HDD 26 into the reference information according to the list stored in RAM 24 and HDD 26, and records the description information thus converted in RAM 24 or HDD 26. Further, CPU 20 records the keyword list and the entry list produced by the list producing programs as well as the externally received credit list in RAM 24 or HDD 26.

Instead of directly overwriting the original description information with the information thus changed, the description information may be copied to RAM 24 or HDD 26, and the copied description information may be converted.

CPU 20 may record the converted description information on an external computer-readable medium via interface 28. Further, CPU 20 may record it on another device via a communications network connected to communications device 30.

The computer-readable mediums storing the description information, keyword list, entry list, credit list and the like are not restricted to ROM 22, RAM 24 and HDD 26, and may be mediums fixedly bearing the description information such as a flexible disk, cassette tape, MO (Magneto-Optical Disk), MD (Mini Disk), DVD- (Digital Versatile Disk-) ROM/RAM/R/RW, SD memory card, IC card (including memory card), optical card, mask ROM, EPROM, EEPROM, flash ROM and other semiconductor memories.

According to the fifth embodiment, since transmission/reception of data such as description information to/from another device can be readily performed via the record medium or communications network, even a movie reproducing device not having a function of efficiently storing the description information can achieve substantially the same effects as those in the first to fourth embodiment.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An information processing device for processing description information, comprising:
    means for reading description information describing multimedia contents from a storage medium wherein
    said description information including keywords describing items in the multimedia contents, and being configured by replacing each remaining keyword except for at least one keyword, among keywords identical to each other included in original description information, with reference information specifying said at least one keyword,
    means for accepting a selection of a keyword, and
    means referring to said description information stored in said storage medium for retrieving a position where the selected keyword is located in said multimedia contents, wherein
        a plurality of scenes constitute said multimedia contents,
        said reference information is described to specify the identical keyword added to a certain scene, and
        the certain scene precedes in time the scene corresponding to said reference information.

2. The information processing device according to claim 1 wherein:
    each said at least one keyword in said original description information has ID information representing itself added, and
    said reference information includes information indicating said ID information added to a keyword not being subjected to replacement with reference information.

3. The information processing device according to claim 1, further comprising:
    means for reproducing said multimedia contents from a position where the selected keyword is located.

* * * * *